United States Patent [19]

Johnson et al.

[11] 4,131,294
[45] Dec. 26, 1978

[54] SKIDDING AND BUNCHING TRAILER

[75] Inventors: Robert G. Johnson, Rothschild; Earl D. Drefcinski, Wausau, both of Wis.

[73] Assignee: J. I. Case Company, Racine, Wis.

[21] Appl. No.: 776,138

[22] Filed: Mar. 10, 1977

[51] Int. Cl.² .............................................. B60P 7/12
[52] U.S. Cl. ................................. 280/179 R; 212/7; 280/404; 294/88; 294/106
[58] Field of Search ............... 214/3, 1 P, 1 SW; 294/88, 104; 144/3 R, 3 D; 267/150; 280/404, 179 R, 482, 656; 212/7

[56] References Cited

U.S. PATENT DOCUMENTS

| | | | |
|---|---|---|---|
| 2,407,840 | 9/1946 | Leonard | 267/150 X |
| 2,574,857 | 11/1951 | Ball | 267/150 X |
| 3,008,731 | 11/1961 | Bombardier | 280/179 R |
| 3,419,282 | 12/1968 | Toews | 280/656 X |
| 3,865,400 | 2/1975 | Johnson | 294/106 X |
| 3,990,688 | 11/1976 | Koch | 267/150 |

*Primary Examiner*—Frank E. Werner
*Attorney, Agent, or Firm*—Dressler, Goldsmith, Clement, Gordon & Shore, Ltd.

[57] ABSTRACT

A trailer attachment for a tree harvester is disclosed herein. The trailer attachment consists of a main frame having a grapple frame supported thereon through a support frame and the support frame is rotated about a vertical axis on the main frame while the grapple frame is supported for pivotal movement about a horizontal axis on the support frame. First and second biasing means are interposed respectively between the main frame and support frame and the support frame and grapple frame so that the grapple frame is returned to a predetermined position wherein an upper support surface extends generally horizontally and the horizontal pivot axis extends generally parallel to the main axle for the trailer.

8 Claims, 5 Drawing Figures

U.S. Patent    Dec. 26, 1978    Sheet 1 of 2    4,131,294
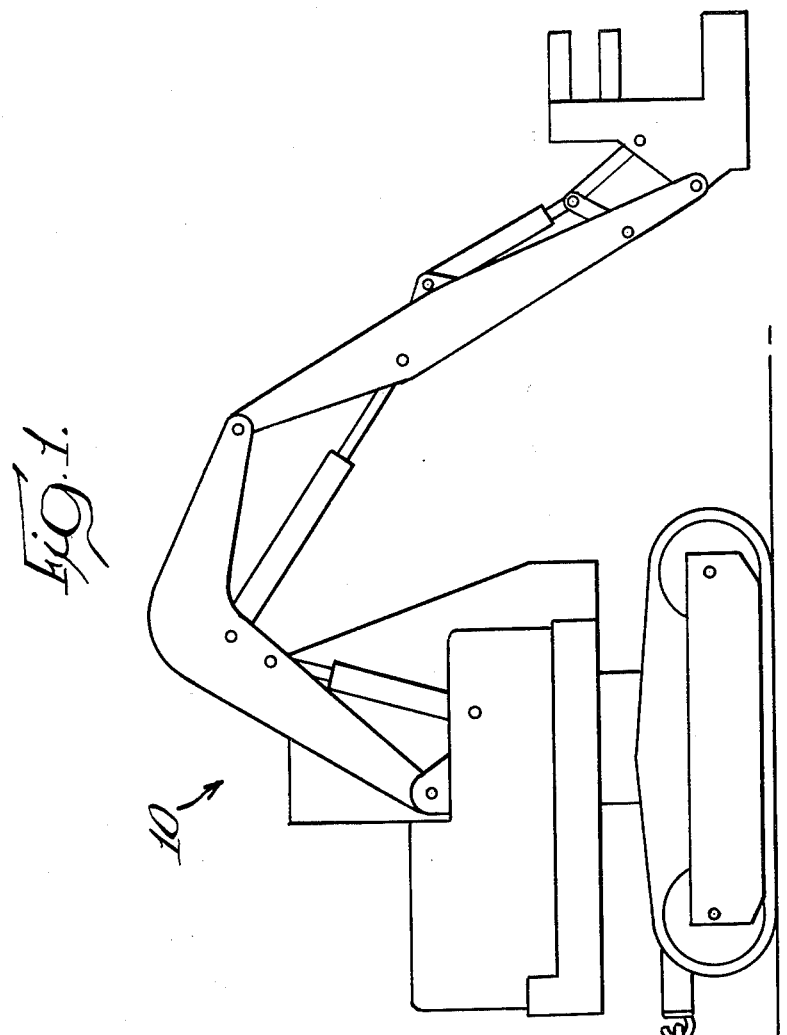
Fig. 1.
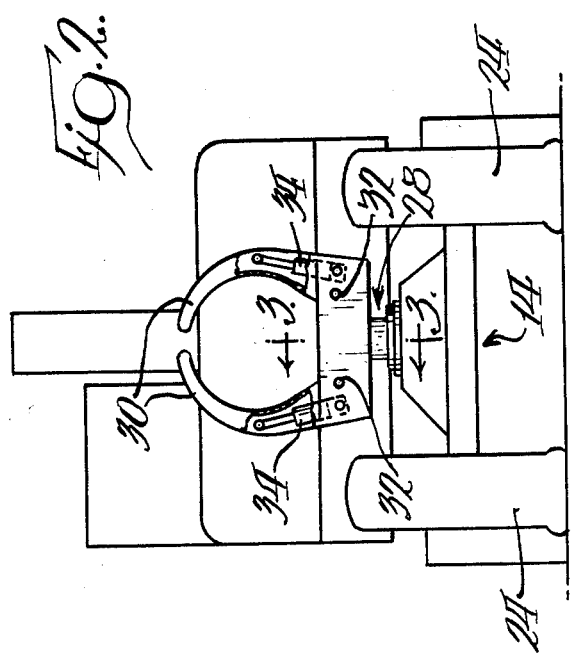
Fig. 2.
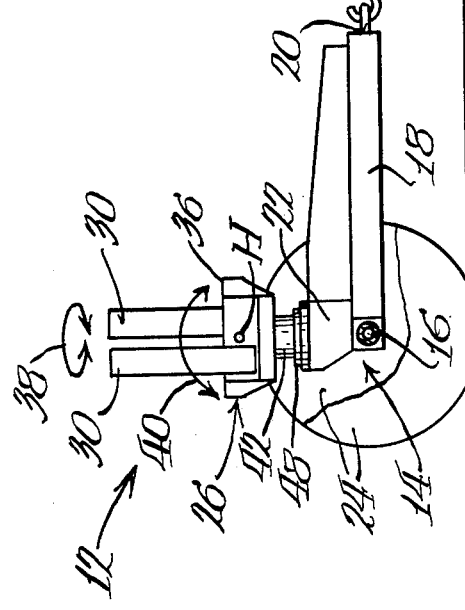

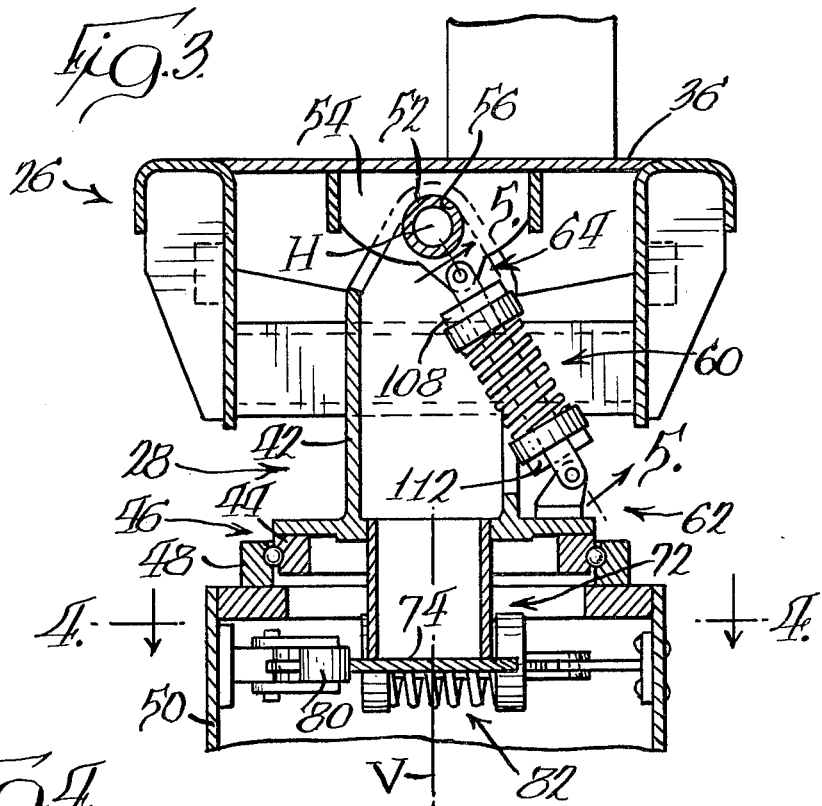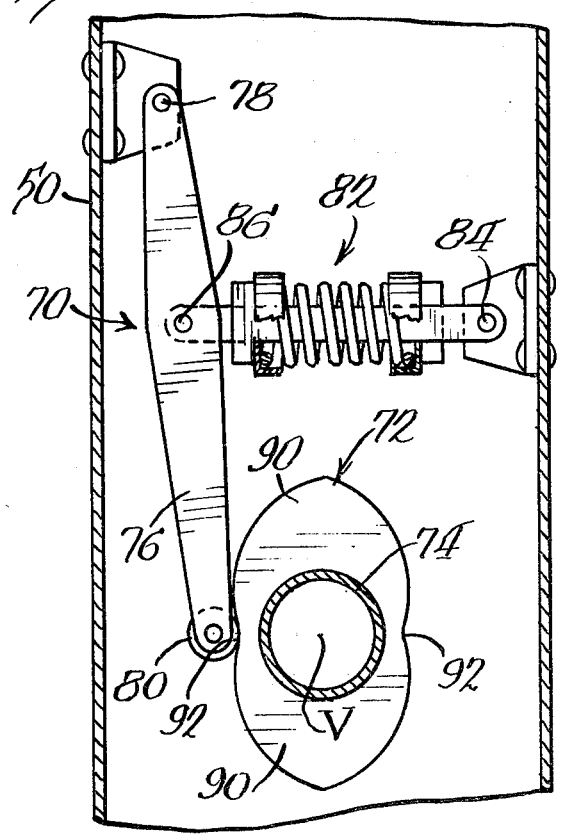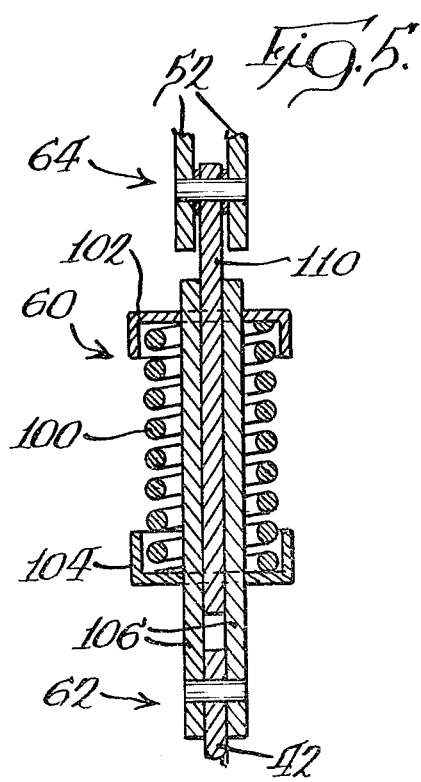

SKIDDING AND BUNCHING TRAILER

BACKGROUND OF THE INVENTION

Mechanical tree harvesting equipment has become increasingly more popular in recent years primarily because of the dwindling supply of labor available for manually harvesting trees. One type of mechanical tree harvesting equipment is disclosed in United States Patent No. 3,727,653. The tree harvester disclosed in this patent consists of a turntable supported on a mobile frame with an articulated boom supported on the turntable and having a tree cutting apparatus on the outer end thereof. Because of the high cost of this type of machinery, it is absolutely essential that the machinery be operated at optimum capacity in order to justify the cost.

In harvesting trees with this type of tree harvester or feller buncher, the trees are normally severed and bunched for subsequent pickup by a tree skidder which takes the bunches of trees to a central location for transportation to some other location.

In many instances, it has been found that the feller buncher is unable to bunch a full skidder load of trees which may occur when the trees are small and scattered or when the trees are selectively cut. This forces the skidder to make several time consuming stops to collect enough bunches to operate at optimum capacity. Of course, such an arrangement lowers the overall efficiency of the harvesting operation.

SUMMARY OF THE INVENTION

The present invention provides a trailing implement which can be attached to the tree harvester or feller buncher so that the trees may be left at selected locations in optimum size bunches to have the skidder operating at maximum efficiency.

The implement consists of a trailer which has a grapple frame supported thereon and the grapple frame pivotally supports a pair of grapple arms that can be moved towards and away from each other to grip one or more trees. The grapple frame has an upper supporting surface for receiving trees and support means are interposed between the grapple frame and the main frame of the trailer so that the grapple frame support surface is always positioned to extend generally perpendicular to the longitudinal axis of the bunch of trees and the surface defines a plane which extends parallel to the axis of the bunch of trees.

This is accomplished by support means between the main frame and the grapple frame which defines first and second pivot axes extending perpendicular to each other and generally horizontally and vertically. The trailer attachment also includes centering means for returning the grapple frame to a predetermined position with respect to the main frame whenever trees are released from the grapple frame.

More specifically, the trailer attachment comprises a main frame that has an elongated axle and a tongue extending from the axle to be attached to the feller buncher and the axle supports a pair of ground engaging wheels at opposite ends thereof. A support frame is rotatably supported on the main frame about an axis that extends generally perpendicular to the axle with an elongated grapple frame supported on the support frame. The trailer attachment also has biasing means between the main frame and the support frame for returning the grapple frame to a position extending generally parallel to the elongated axle when trees are removed from the grapple frame.

According to another aspect of the invention, the grapple frame is supported on the support frame on a generally horizontal pivot axis with further biasing means between the support frame and grapple frame which return the grapple frame to a generally horizontal position when trees are removed from the upper surface thereof.

With the present arrangement, the grapple frame can rotate 360 degrees with respect to a vertical pivot axis and also rotate about a horizontal pivot axis so that the trees supported on the grapple frame can assume any position with respect to the tree harvester while the grapple arms can still positively grip the trees in a secure fashion.

BRIEF DESCRIPTION OF THE SEVERAL VIEWS OF THE DRAWINGS

FIG. 1 shows a tree harvesting apparatus with the trailer attachment of the present invention secured thereto;

FIG. 2 is a rear view of the trailer attachment;

FIG. 3 is an enlarged vertical sectional view as viewed generally along line 3—3 of FIG. 2;

FIG. 4 is a horizontal sectional view as viewed along line 4—4 of FIG. 3, and

FIG. 5 is a fragmentary sectional view as viewed along line 5—5 of FIG. 3.

DETAILED DESCRIPTION

While this invention is suceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows a tree harvesting apparatus or feller buncher generally designated by the reference numeral 10 having the trailer attachment 12 of the present invention attached to one end thereof. Since tree harvesting apparatus 10 forms no part of the present invention, a detailed description thereof does not appear to be necessary. However, for purposes of completeness, the tree harvester apparatus may be of the type disclosed in United States Patent No. 3,727,653, which is incorporated herein by reference.

Trailer attachment 12 consists of a main frame 14 including a transversely extending axle 16 and a torque portion 18 extending forwardly of the axle with a hitch structure 20 at the forward end adapted to be attached to tree harvester 10. Main frame 14 also includes an upper frame structure 22 and the entire main frame 14 is supported on a pair of wheels 24 which are respectively located at the outer ends of elongated axle 16.

Trailer attachment 12 also includes a grapple frame 26 which is supported on main frame 14 through a support means 28 which will be described in more detail later. Grapple frame 28 has a pair of movable grapple arms 30 respectively pivoted about pivot pins 32 through fluid rams 34 (FIG. 3) which are interposed between frame 26 and the lower ends of grapple arms 30 (not shown).

As shown in FIGS. 2 and 3, the grapple arms are offset from each other by a small dimension and are symmetrically positioned with respect to a vertical center of rotation as will be explained later. Thus, actuation of the fluid rams 34 will pivot grapple arms towards each other into overlapping relation so that one or more trees can be positively gripped between the arms 30 and an upper flat supporting surface 36 of grapple frame 26.

According to the present invention, support means 28 includes mechanism for supporting grapple frame 26 for pivotal movement about a horizontal axis as well as rotational movement about a vertical axis so that supporting surface 36 may assume any angular position with respect to tree harvester 10. This pivotal movement is generally illustrated by the arrows 38 and 40 in FIG. 1.

The trailer attachment also incorporates biasing means or centering means for returning the grapple frame to the position illustrated in the drawing whenever trees are removed from supporting surface 36 after being released by grapple arms 30. The details of the support means 28 and the centering means are illustrated in FIGS. 3 and 4.

As shown in FIG. 3, support means 28 includes a support member 42 that has an inner race 44 of a bearing 46 secured thereto. The outer race 48 of bearing 46 is fixedly secured to an upper end portion of circular member 50 that forms part of main frame 14 more specifically upper frame structure 22. The two circular bearing races 44 and 48 with rollers interposed allow support member 42 to be rotated 360 degrees about a vertical axis indicated by reference numeral V.

The upper end of support member 42 has a tube or other circular member 52 fixedly secured thereto and grapple frame 26 has one or more spaced elements 54 which have openings 56 that receive tube 52 to define a horizontal pivot axis H for grapple frame 26.

Thus, grapple frame 26 can be pivoted about horizontal pivot axis H in the directions indicated by arrows 40 in FIG. 1 and grapple frame 26 along with support member 28 can also be simultaneously rotated or pivoted about vertical pivot axis V. This means that supporting surface 36 and the grapple arms 30 can assume any desired or required position with respect to trailer frame 14.

According to another aspect of the present invention, the grapple frame and support frame have biasing means cooperating therewith so that grapple frame 26 always assumes essentially the same position with respect to trailer frame 14 whenever trees are removed from grapple frame 26.

As illustrated in FIG. 3, a first biasing means 60 is interposed between support member 42 and grapple frame 26. Biasing means 60 has one end pivotally connected to support member 42 through a first pivot 62 while the opposite end is connected through a second pivot 64 to grapple frame 26. Pivots 62 and 64 are arranged such that support surface 36 is generally horizontal when the two pivots are located in a common flat inclined plane with horizontal pivot axis H, as illustrated in FIG. 3. However, should grapple frame 26 be pivoted about horizontal pivot H, second pivot 64 will move away from such plane and will cause compression of spring means 60 (to be described later). If the external force resulting in such pivotal movement is withdrawn from grapple frame 26, the compression of spring means 60 will return the frame to the position illustrated in FIG. 3.

The biasing means for returning grapple frame and support frame 42 to a position illustrated in the drawings is most clearly shown in FIG. 4. Biasing means 70 consists of a cam 72 that is secured to a sleeve 74 extending from and forming part of support member 42. Biasing means 70 also includes a cam follower consisting of an arm 76 pivoted on frame portion 50 through pivot pin 78 with a roller 80 on the free end of arm 76. Roller 80 is biased into engagement with the periphery of cam 72 through spring means 82 having one end pivotally connected to support 50 at 84 and the opposite end connected through pin 86 to an intermediate portion of arm 76.

As clearly shown in FIG. 4, cam 72 has a first lobe 90 at one end and a second identical lobe 90 at the opposite end with recessed portions 92 located between the respective inner ends of the lobes. Recessed portions 92 define minimum points of spacing for the peripheral surface of cam 72 with respect to vertical axis V. These recesses 92 are positional with respect to sleeve 74 so that grapple frame 26 is in the position illustrated in FIG. 2 when roller 80 is in either of the recesses. Thus, should grapple frame 26 and support means 28 be rotated about vertical axis V, cam follower will ride along the peripheral surface of one lobe 90 of cam 72 and increase the compression of spring means 82. When the external force causing such rotational movement is released, the force of biasing means 82 will return the grapple frame 26 and support means 28 to the position illustrated in FIGS. 3 and 4.

It should be noted that two such recesses 92 are located 180 degrees apart from each other on peripheral cam surface of cam 72. Thus, the grapple frame 26 and support means 28 need only be moved a maximum of 90 degrees to automatically assume the position illustrated in FIG. 1. It should be noted that since the grapple arms 30 are symmetrically located with respect to a vertical plane extending through horizontal axis H, it is immaterial which of the arms is forward and which of the arms is rearward of such horizontal axis when the grapple frame 26 is in the position illustrated in FIG. 1.

While any number of different types of compression or tension biasing means could be utilized for the self-centering means for grapple frame 26, a specific example of biasing means has been illustrated in FIG. 5. Biasing means 60 and 82 are preferably identical in construction to reduce the overall cost and a specific example of such biasing means is disclosed in FIG. 5.

As shown in FIG. 5, biasing means consists of a compression spring 100 that is located between a pair of cup shaped elements 102 and 104. Cup shaped element 102 is secured to a pair of links 106 which have one end connected by pivot 62 to support member 42. For example, this may be accomplished by having intergral extensions 108 (FIG. 3) on the upper end of links 106 which engage cup shaped element 102. Likewise, cup element 104 is secured to a link 110 that is located between links 106 and again link 110 has an extension 112 (FIG. 3) which engages the outer surface of the cup. Thus, movement of pivot 64 with respect to pivot 62 will cause compression of spring 100 and when the external force causing such movement is released, the compression spring 100 will return all of the elements to the position illustrated in FIG. 3. The same applies to the second biasing means or compression spring means 82 cooperating with arm 76.

Thus, it can be appreciated that the above described trailer attachment can be constructed in a very inexpensive manner and will allow for universal pivotal movement of support surface 36 with respect to frame 14. For example, it is desirable that elongated surface 36 at all times extend transversely of the elongated axes of the bunch of trees so that a secure grip can be obtained through grapple arms 30. Also, a plane extending parallel to upper supporting surface 36 should also extend parallel to the axis of the bunch of trees at all times. This is accomplished by the horizontal and vertical pivots described above. Furthermore, whenever a bunch of trees are removed from the grapple frame, the grapple frame automatically assumes the position illustrated in FIG. 1.

The advantages of utilizing a trailer attachment of the above type in conjunction with a tree harvester is believed to be understood from the above description. The pivotal movement about horizontal pivot axis H allows grapple frame or bunk 26 to pivot with respect to the remainder of the trailer attachment to compensate for uneven terrain but will also automatically be returned to a generally level condition whenever the bunch of trees is removed. The self-centering means also eliminates the problem of having an empty grapple frame and grapple arms oscillating back and forth while travelling over rough terrain. The rotational movement of 360 degrees about vertical axis V allows the trees supported on upper support 36 and gripped by grapple arms 30 to assume any angular position with respect to main frame 14. However, when a bunch of trees is removed, the grapple frame 26 will automatically be returned to a position illustrated in FIG. 1 which is the desirable position for loading trees onto grapple frame.

It will be noted that it is desirable that grapple frame 26 and arms 30 be located rearwardly on frame 14 a sufficient distance so that trees, after having been served by harvesting apparatus 10, can be manipulated through operation of the boom to have the base end of the tree received between the grapple arms.

While a specific embodiment has been illustrated and described, it will be appreciated that various changes can be made without departing from the spirit of the invention. For example, spring means 60 and 82 need not be compression springs of the type illustrated and could readily be tension springs. Also, while cam 72 has been illustrated as incorporating two lobes and two recesses between the lobes so that the grapple frame 26 is always returned to either of two positions which are 180 degrees apart from each other, it can readily be appreciated that cam 72 could be configured so that grapple frame would only return to one position whenever an external force is released.

What is claimed is:

1. A trailer attachment for a tree harvester comprising a main frame including an elongated axle having ground engaging wheels at opposite ends thereof, a support frame rotatably supported on said main frame about an axis extending perpendicular to said axle, an elongated grapple frame supported on said support frame, and biasing means between said main frame and said support frame for returning said grapple frame and said support frame to a position where said grapple frame extends generally parallel to said elongated axle when trees are removed from said grapple frame, said biasing means includes a cam fixed to said support frame, a cam follower pivoted on said main frame, and spring means between said main frame and said cam follower for maintaining said cam follower in engagement with said cam.

2. A trailer attachment as defined in claim 1, in which said grapple frame has a generally flat upper surface and is pivoted about a generally horizontal pivot axis on said support frame, further including second biasing means between said support frame and said grapple frame for returning said upper surface to a generally horizontal position when trees are removed from said upper surface.

3. A trailer attachment for a tree harvester comprising a main frame including an elongated axle having ground engaging wheels at opposite ends thereof, a support frame carried by said main frame, a grapple frame pivoted about a generally horizontal axis on said support frame and having a generally flat upper support surface for supporting trees thereon, and biasing means pivoted at one end on said support frame through a first pivot and at an opposite end on said grapple frame through a second pivot, said first and second pivots being arranged so that said pivots and said horizontal pivot axis are located in a common inclined plane to position said upper support surface generally horizontal when trees are removed from said grapple frame.

4. A trailer attachment as defined in claim 3, in which said support frame is supported for 360 degrees rotation about a vertical pivot axis on said main frame and further including additional biasing means between said main frame and said support frame for returning said support frame to a position where said horizontal pivot axis extends generally parallel to said axle when trees are removed from said grapple frame.

5. A trailer attachment for a tree harvester comprising: a main frame having ground engaging members, a grapple frame having movable grapple arms supported thereon, and support means between said frames defining first and second pivot axes extending substantially perpendicular to each other and respectively defining a substantially horizontal pivot axis and a substantially vertical pivot axis with respect to the ground for said grapple frame on said main frame, said support means including a support member supported for rotation on said main frame and defining said vertical pivot axis, with said grapple frame pivoted on said support member to define said horizontal pivot axis, centering means for returning said grapple frame to predetermined positions about said axes with respect to said main frame upon release of trees supported on said grapple frame, said centering means including first biasing means between said support member and said grapple frame and second biasing means between said main frame and support frame.

6. A trailer attachment as defined in claim 5, in which said first biasing means includes a cam fixed to said support frame, a cam follower pivoted on said main frame, and spring means between said main frame and said cam follower biasing said cam follower into engagement with said cam.

7. A trailer attachment as defined in claim 6, in which said second biasing means includes spring means having one end pivoted on said support frame by a first pivot and an opposite end pivoted on said grapple means by a second pivot, said spring means returning said grapple frame to a position where said pivots and said horizontal pivot axis are located in a common flat plane upon release of trees supported on said grapple frame.

8. A trailer attachment for a tree harvester comprising a main frame including an elongated axle having ground engaging wheels at opposite ends thereof, a support frame rotatable 360 degrees about a vertical pivot axis on said main frame, a first biasing means normally maintaining said support frame in a predetermined position with respect to said main frame and accommodating relative rotational movement about said vertical pivot axis, an elongated grapple frame pivoted about a generally horizontal pivot axis on said support frame and having a generally flat upper support surface for supporting trees thereon, means on said grapple frame for gripping trees supported on said support surface, and second biasing means normally maintaining said support surface in a generally horizontal position with said first biasing means normally maintaining said elongated grapple frame generally aligned with said elongated axle.

* * * * *